(12) United States Patent
Nishimura

(10) Patent No.: US 12,043,506 B2
(45) Date of Patent: Jul. 23, 2024

(54) DOCUMENT FEEDER AND IMAGE FORMING APPARATUS

(71) Applicant: SHARP KABUSHIKI KAISHA, Sakai (JP)

(72) Inventor: Toshiki Nishimura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 310 days.

(21) Appl. No.: 17/488,135

(22) Filed: Sep. 28, 2021

(65) Prior Publication Data
US 2022/0106139 A1 Apr. 7, 2022

(30) Foreign Application Priority Data
Oct. 2, 2020 (JP) .................. 2020-167741

(51) Int. Cl.
*B65H 3/06* (2006.01)
*B65H 3/52* (2006.01)
*B65H 5/06* (2006.01)
*H04N 1/00* (2006.01)

(52) U.S. Cl.
CPC ............ *B65H 3/0669* (2013.01); *B65H 3/06* (2013.01); *B65H 3/52* (2013.01); *B65H 5/062* (2013.01); *H04N 1/00588* (2013.01); *H04N 1/00591* (2013.01); *H04N 1/00602* (2013.01); *B65H 2403/40* (2013.01); *B65H 2404/16* (2013.01)

(58) Field of Classification Search
CPC .. B65H 3/0669; B65H 5/062; B65H 2403/40; B65H 2403/80; B65H 2404/15; B65H 2404/16
See application file for complete search history.

(56) References Cited

U.S. PATENT DOCUMENTS

| 5,209,465 | A | * | 5/1993 | Sayama | B65H 3/0669 271/118 |
| 5,551,684 | A | * | 9/1996 | Sata | B65H 3/063 271/118 |
| 2012/0228822 | A1 | * | 9/2012 | Akiyama | B65H 5/36 271/264 |
| 2014/0319764 | A1 | * | 10/2014 | Saito | F16D 3/68 74/411 |
| 2019/0263616 | A1 | * | 8/2019 | Fujiwara | B65H 31/02 |

FOREIGN PATENT DOCUMENTS

JP 2001-130770 A 5/2001

\* cited by examiner

*Primary Examiner* — Prasad V Gokhale
(74) *Attorney, Agent, or Firm* — ScienBiziP, P.C.

(57) ABSTRACT

A document feeder constituting an image forming apparatus includes a paper feeder to supply a document to a document transport path, a first transporter to transport the document toward image reading positions, and a second transporter to transport the document toward the document discharging tray while supplying the document to the image reading positions. Furthermore, the document feeder includes a motor provided on the first frame, a first driver provided on the first frame and to transmit driving force generated by the motor to the paper feeder and the first transporter, a second driver provided on the second frame and to transmit the driving force generated by the motor to the second transporter, and a second driver to transmit the driving force generated by the motor to the second transporter, and a relay transmission member to transmit the driving force generated by the motor to the second driver.

8 Claims, 8 Drawing Sheets

LEFT ←——→ RIGHT

LEFT ←——→ RIGHT

DOCUMENT FEEDER AND IMAGE FORMING APPARATUS

BACKGROUND OF THE INVENTION

Field of the Invention

This invention relates to a document feeder and an image forming apparatus, in particular, for example, to a document feeder and an image forming apparatus which transport a document to an image reading position where an image reader to read an image is located.

Description of the Background Art

An example of a conventional document feeder is disclosed in Japanese Patent Laid-open Publication No. 2001-130770. The document feeder of Japanese Patent Laid-open Publication. No. 2001-130770, which is configured as a paper transporting device of an image reading device, comprises a paper separator to separate documents laid on a document tray one by one, a transport roller device to transport the separated document, a reading roller device to supply the document transported by the transport roller device to a reading unit, and a drive motor. A motor shaft of the drive motor connects a first drive transmission system and a second drive transmission system via pulleys and a timing belt so that they are independent of each other. The first drive transmission system is to transmit drive power to the paper separator and the transport roller device, and the second drive transmission system is to transmit drive power to the reading roller device, both of which are provided on a rear frame of an image reading device body.

In the paper transport device a document feeder) of Japanese Patent Laid-open Publication No. 2001-130770, since the first drive transmission system and the second drive transmission system are independent of each other, it is possible to reduce vibrations which propagate from the paper separator and the transport roller device to the reading roller device via the first drive transmission system and the second drive transmission. However, since the first drive transmission system propagates the vibrations thereof to the second drive transmission system through the rear frame of the image reading device body, it is difficult to sufficiently reduce the vibration of the second drive transmission system (including a pulley, a timing belt, and the like). As a result, there was a problem in that the vibration of the second drive transmission system, which propagates to the reading roller device, causes a document supplied to the reading unit to vibrate, so that it impairs the reacting accuracy of the image.

Therefore, a main object of the present invention is to provide a novel document feeder and an image forming apparatus.

Another object of the present invention is to provide a document feeder and an image forming apparatus capable of improving the reading accuracy of an image.

SUMMARY OF THE INVENTION

A document feeder of a first aspect of the present invention, which has: a document transport path to direct a document toward an image reading position where an image reader to read an image is located; a document stacking tray to stack the document to be supplied to the document transport path; and a document discharging tray to dispose the document discharged from the document transport path, including: a paper feeder to supply the document stacked on the document stacking tray to the document transport path one by one; a first transporter having a plurality of first transport rollers to transport the document supplied to the document transport path toward the image reading position; a second transporter having a plurality of second transport rollers to transport the document in which the image has been read toward the document discharging tray while supplying the document transported by the first transporter to the image reading position; a first frame to support one axial end of each of the plurality of first transport rollers and the plurality of second transport rollers; a second frame to support the other axial end of each of the plurality of first transport rollers and the plurality of second transport rollers; a first driving source provided on the first frame; a first driver provided on the first frame and to transmit rotational force generated by the first driving source to the paper feeder and the first transporter as driving force; a second driver provided on the second frame and to transmit the rotational force generated by the first driving source to the second transporter as driving force; and a relay transmission member to transmit the rotational force generated by the first driving source to the second driver.

In a document feeder of a second aspect of the present, invention depending from the first aspect, the relay transmission member consists of one of the plurality of second transport rollers.

In the document feeder of a third aspect of the present invention depending from the first and second aspect, a driving gear is provided on a rotating shaft of the first driving source, a first gear is provided on the relay transmission member, and a first connection gear is provided between the driving gear and the first gear so as to meth therewith.

In the document feeder of a fourth aspect of the present invention depending from the third aspect, the first driver comprises: a paper feeding driver to transmit the rotational force generated by the first driving source to the paper feeder as the driving force; and a transporting driver to transmit the rotational force generated by the first driving source to the first transporter as the driving force, a second gear is provided at the most upstream part of a force transmission path in the transporting driver, a second connection gear is provided between the driving gear and the second gear so as to meth therewith, and the first connection gear and the second connection gear are arranged at each position to sandwich the driving gear.

In the document feeder of a fifth aspect of the present invention depending from the fourth aspect, a third gear is provided at the most upstream part of a force transmission path in the paper feeding driver, and the third gear meshes with the second connection gear.

In the document feeder of a sixth aspect of the present invention depending from the fifth aspect, the second gear and the third gear are arranged at each position to sandwich the second connection gear.

A document feeder of a seventh aspect of the present invention, which has: a document transport path to direct a document toward an image reading position where an image reader to read an image is located; a document stacking tray to stack the document to be supplied to the document transport path; and a document discharging tray to dispose the document discharged from the document transport path, including: a paper feeder to supply the document stacked on the document stacking tray to the document transport path one by one; a first transporter having a plurality of first transport rollers to transport the document supplied to the document transport path toward the image reacting position;

a second transporter having a plurality of second transport; rollers to transport the document in which the image has been read toward the document discharging tray while supplying the document transported by the first transporter to the image reacting position; a first frame to support one axial end of each of the plurality of first transport rollers and the plurality of second transport rollers; a second frame to support the other axial end of each of the plurality of first transport rollers and the plurality of second transport rollers; a first driving source provided on the first frame; a second driving source provided on the second frame; a first driver provided on the first frame and to transmit rotational force generated by the first driving source to the paper feeder and the first transporter as driving force; and a second driver provided on the second frame and to transmit rotational force generated by the second driving source to the second transporter as driving force.

An image forming apparatus of a eighth aspect of the present invention includes the document feeder according to any one of the first to the seventh aspects.

According to the present invention, since the first frame and the second frame are separated from each other, the vibration unlikely propagates from the first driver provided on the first frame to the second driver provided on the second frame. Therefore, it is possible to suppress the vibration of both the second driver and the second transporter as well as suppress the vibration of the document supplied to the image reading position by the second transport roller, so that the reacting accuracy of the image at the image reading position can be improved.

The above mentioned or other objects, features, and advantages of the present invention will be revealed by reading the following detailed description of embodiments with reference to the drawings.

DESCRIPTION OF THE PREFERRED EMBODIMENTS

First Embodiment

Figure 1:
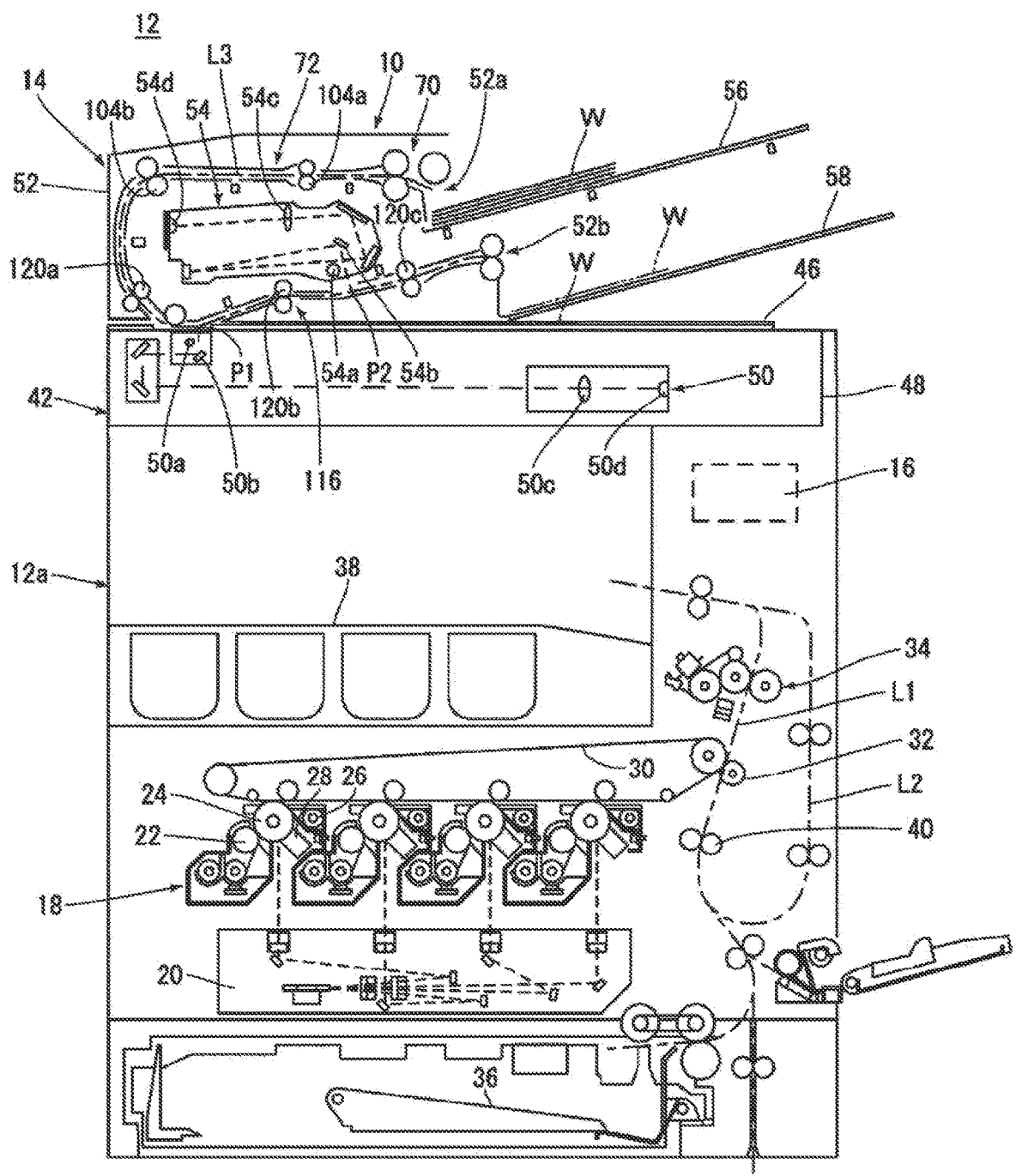
FIG. 1 is a schematically cross-sectional view illustrating an internal structure of an image forming apparatus including a document feeder according to a first embodiment of the present invention.
Figure 1:

As shown in FIG. 1, a document feeder 10 according to a first embodiment of the present invention is a part of an image reading device 14 which is incorporated in an image forming apparatus 12. In the following, a basic configuration of the image forming apparatus 12 is first described, and subsequently the image reading device 14 (including the document feeder 10) is described. Each of directional references including front, rear, left, right, up and down, which are used in the following description, is defined as the direction viewed from a user who operates the image forming apparatus 12. Namely, the terms "front", "back", "left", and "right" means a near side, a deep side, a left-hand side, and a right-hand side viewed from the user, respectively. In addition, the terms "up" and "down" means vertically upward and vertically downward, respectively. These directional references corresponds to orientations indicated by arrows in the drawings.

As shown in FIG. 1, the image forming apparatus 12 is a multifunction peripheral (MFT) having a copy function, a printer function, a scanner function, a facsimile function, etc., and includes an image forming apparatus body 12a and the image reading device 14 disposed on the same.

Inside the image forming apparatus body 12a, there are a control unit 16, an image forming unit 18 and the like. The control unit 16 includes a CPU, a memory, and the like, transmits a control signal to each part of the image forming apparatus 12 in response to an input operation to an operation panel and the like (not shown), and controls various operations of the image forming apparatus 12 (including the document feeder 10).

The image forming unit 18 includes an exposure unit 20, a developer 22, a photoreceptor drum 24, a cleaner unit 26, a charger 28, an intermediate transfer belt unit 30, a transfer roller 32, a fusing unit 34, etc. The image forming unit 18 forms an image on a paper (not shown) conveyed from a paper feeding tray 36 or the like, as well as discharges the paper on which the image is formed into a paper discharging tray 38. The image data, which are read by the below described first image reader 50 and a second image reader 54 or transmitted from an external computer or the like, are used as the image data for forming the image on the paper.

The image data handled by the image forming apparatus 12 correspond to a color image using four colors consisting of black (K), cyan (C), magenta (M), and yellow (Y). Therefore, the developer 22, the photoreceptor drum 24, the cleaner unit 26 and the charger 28 are provided for every color so that four types of latent images corresponding to four colors are formed, whereby these constitute four image stations.

Furthermore, inside the image forming apparatus body 12a, there are provided a first paper transport path L1 for transporting the paper from the paper feeding tray 36 into the paper discharging tray 38 via a resist roller 40, the transfer roller 32, and the fusing unit 34. Furthermore, when a duplex printing is performed, there is configured a second paper transport path L2 for returning the paper passing through the fusing unit 34, of which a front side printing is finished, to the first paper transport path L1 at the upstream side of the transfer roller 32 in a paper transport direction. In the first paper transport path L1 and the second paper transport path L2, there are provided a plurality of transport rollers to provide an auxiliary propulsion to the paper as appropriate.

Figure 3:
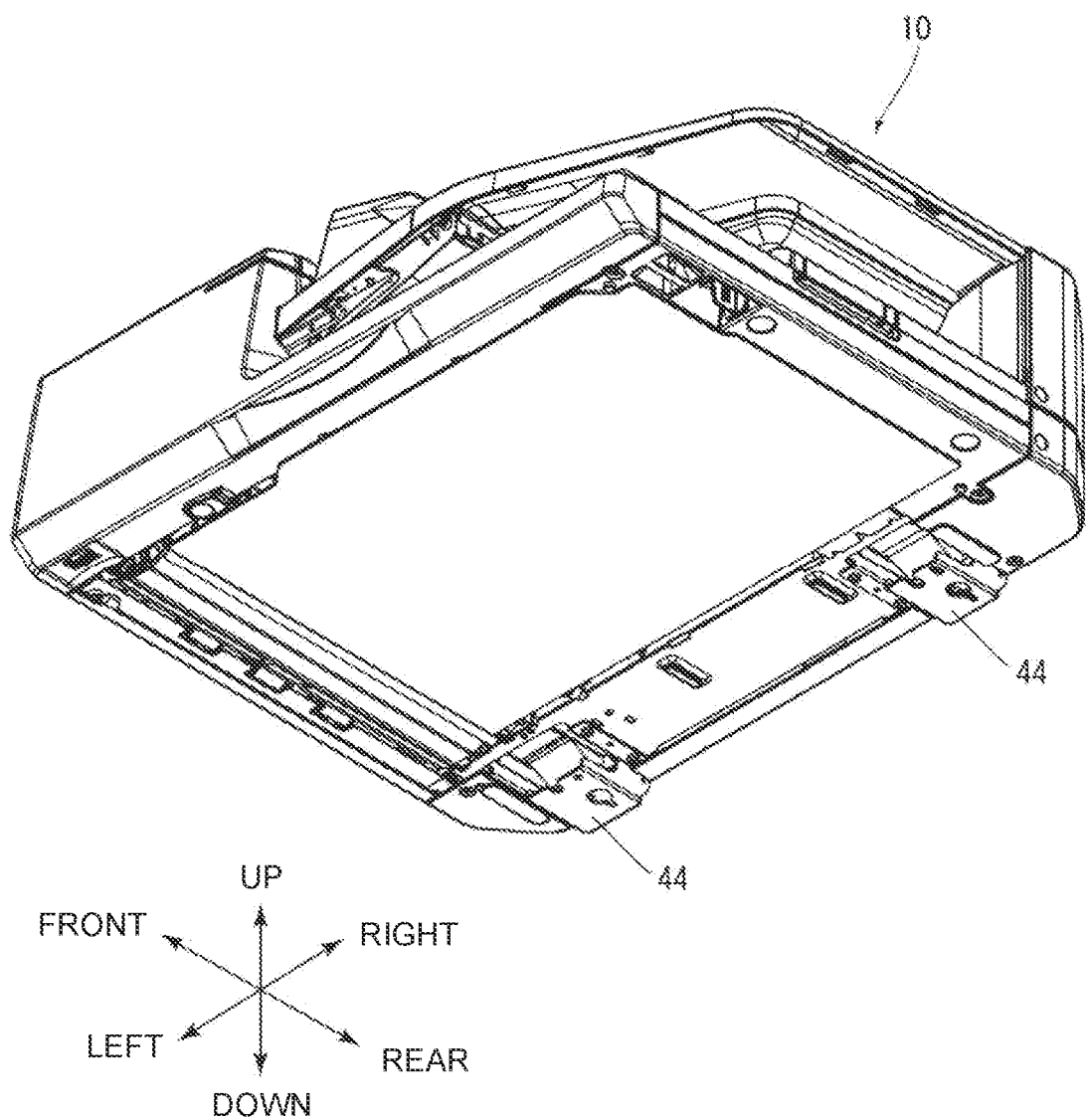
FIG. 3 is a perspective view illustrating the appearance of the document feeder when viewed from obliquely downward.

As shown in FIG. 1, the image reading device 14 includes a reading device body 42 and the document feeder 10 which is rotatably attached on the reading device body 42 using two hinge devices 44 (FIG. 3). As shown in FIG. 3, two hinge devices 44 are provided on a downside of a rear end of the document feeder 10 in both the left and right directions with being spaced at a predetermined distance apart from each other in order to connect an upside of the rear end of the reading device body 42 (FIG. 1) and the downside of the rear end of the document feeder 10. In addition, on the front side of the reading device body 42 of the reading apparatus shown in FIG. 1, there is provided an operation panel (not shown) to receive input operations such as printing instructions by a user. The operation panel has appropriately a display with a touch panel, operation buttons and the like.

The reading device body 42 has a housing 48 on the upside of which a document laying table 46 made of a transparent material is provided, and a first image reader 50 to read an image of a document W is provided inside the housing 48. The first image reader 50 includes a light source 50*a*, a plurality of mirrors 50*b*, an imaging lens 50*c*, a reading sensor (line sensor) 50*d*, etc., and the light source 50*a*, the plurality of mirrors 50*b* and the like constitute a scanning unit. When the first in reader 50 reads an image formed on the surface of the document W, the light source 50*a* exposes the surface of the document W, the plurality of mirrors 50*b* direct a reflected light reflected on the surface of the document W to the imaging lens 50*c*, and the imaging lens 50*c* images the reflected light onto a light receiving element (not shown) of the reading sensor 50*d*. The reading sensor 50*d* detects the luminance and chromaticity of the imaged reflected light and generates image data based on the image of the document W. As the reading sensor 50*d*, a CCD (Charge Coupled Device), a CIS (Contact Image Sensor) or the like is used.

The first image reader 50 can carry out a fixed image reading in which an image of a document W laid on the document laying table 46 is read, and a moving image reading in which an image of a document W being transported along a document transport path L3 by the document feeder 10 is read. Namely, in the case of the fixed reacting, with the scanning unit which includes the light source 50*a* and the plurality of mirrors 50*b* reciprocating in a sub-scanning direction below the document laying table 46, the first image reader 50 reads an image of a document W's surface on the side of the first image reader 50 (i.e., a surface side). On the other hand, in the case of the moving image reading, with the scanning unit being on standby below a first image reading position P1 which is a home position, as the document W transported by the document feeder 10 is passing through the first image reading position P1, the first image reader 50 reads the image of the document W's surface on the side of the first image reader 50 (i.e., a surface side).

As shown in FIG. 1, the document feeder 10 is an automatic document feeder (ADF: Auto Document Feeder) capable of automatically and continuously feeding a sheet of document W one by one, and includes a housing 52, the second image reader 54, the document transport path L3, a document stacking tray 56 on which a document W supplied to the document transport path L3 is set, and a document discharging tray 58 on which a document W discharged from the document transport path L3 is disposed.

Figure 2:
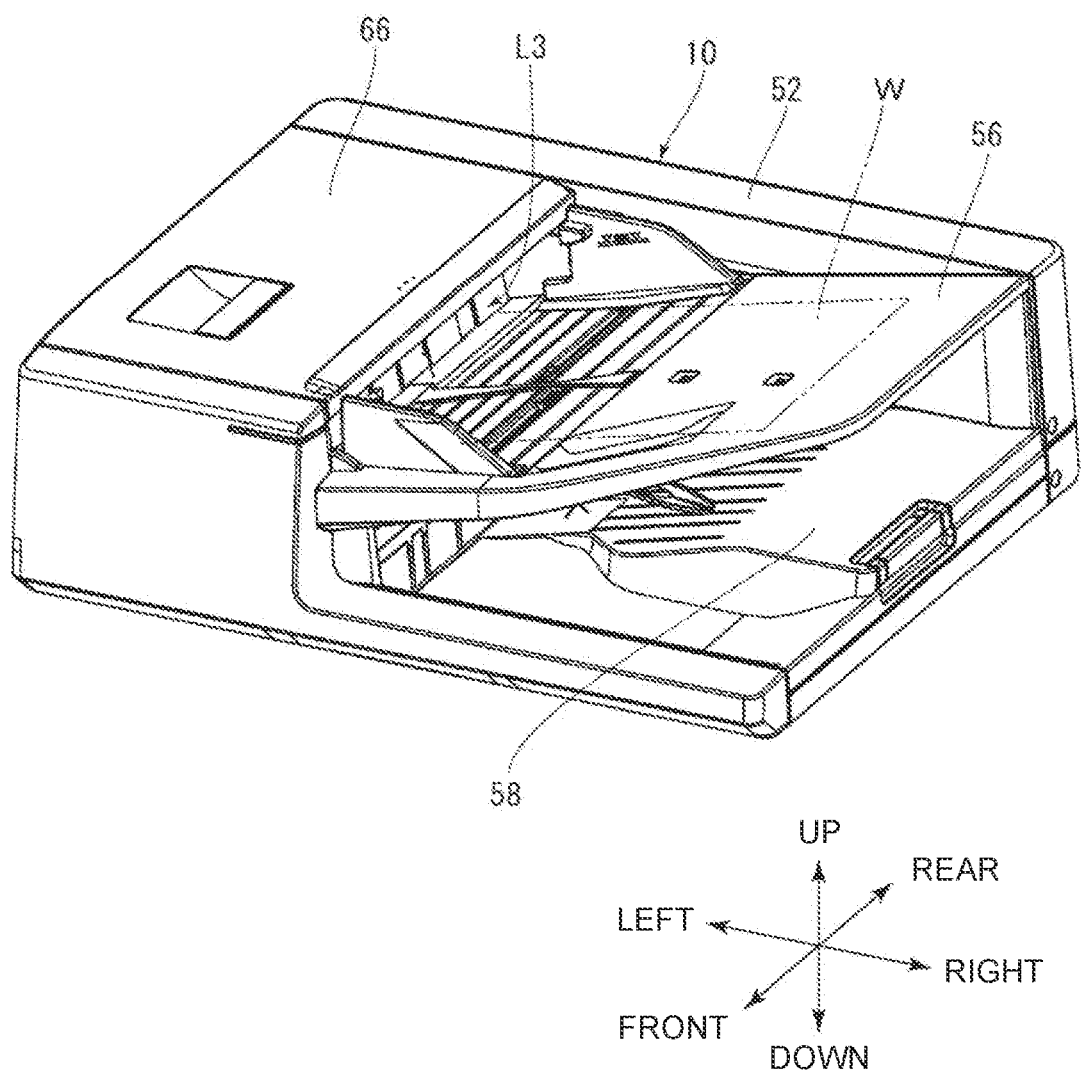
FIG. 2 is a perspective view illustrating an appearance of the document feeder when viewed from obliquely upward.
Figure 4:
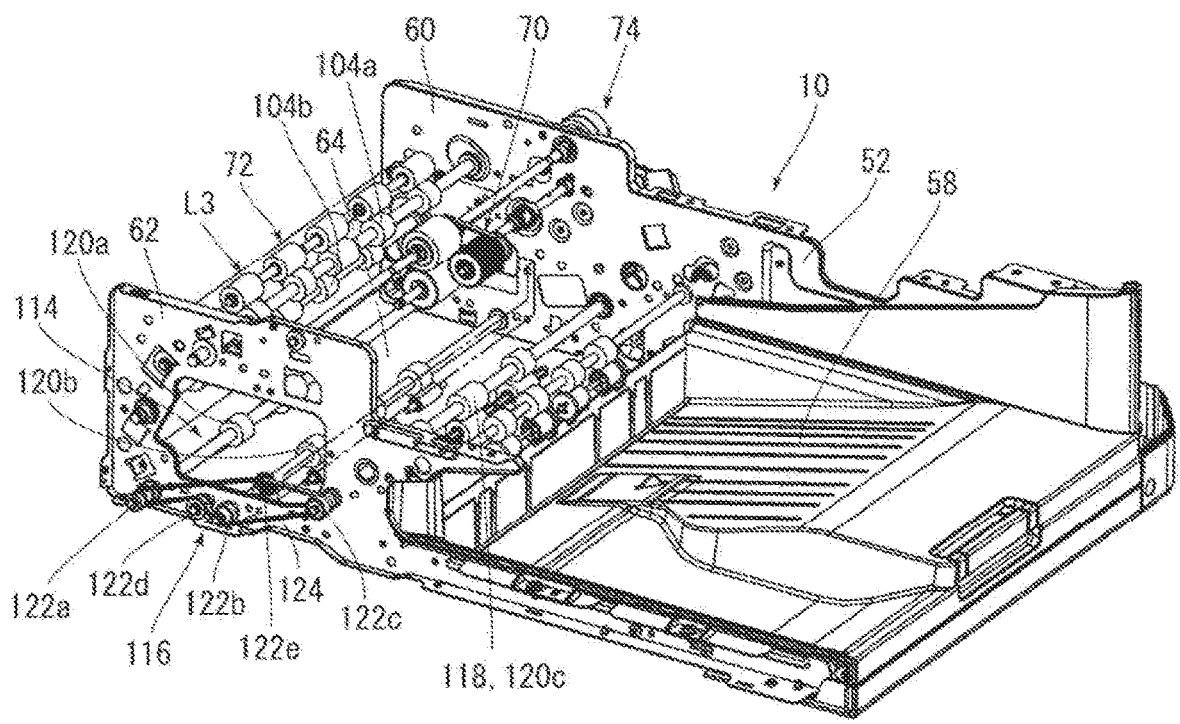
FIG. 4 is a perspective view illustrating a configuration of the document feeder when viewed from obliquely upward front.
Figure 4:
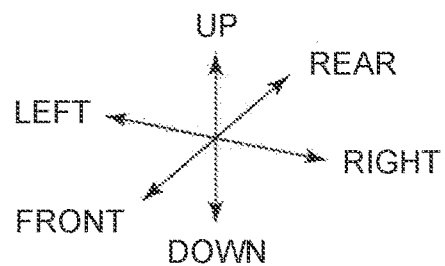

As shown in FIG. 4, the housing 52 is provided with a first frame 60 on the rear side (rear side), a second frame 62 on the front side (front side), a third frame 64 bridged between the first frame 60 and the second frame 62, and an external cover member 66 (FIG. 2) covering the same. In FIG. 4, the third frame 64 is shown by a two-dot chain line. As shown in FIG. 1, a paper feeding opening 52*a* is formed at a center part of the upside of the housing 52, and a paper discharging opening 52*b* is formed at a center part of the downside of the housing 52.

Figure 6:
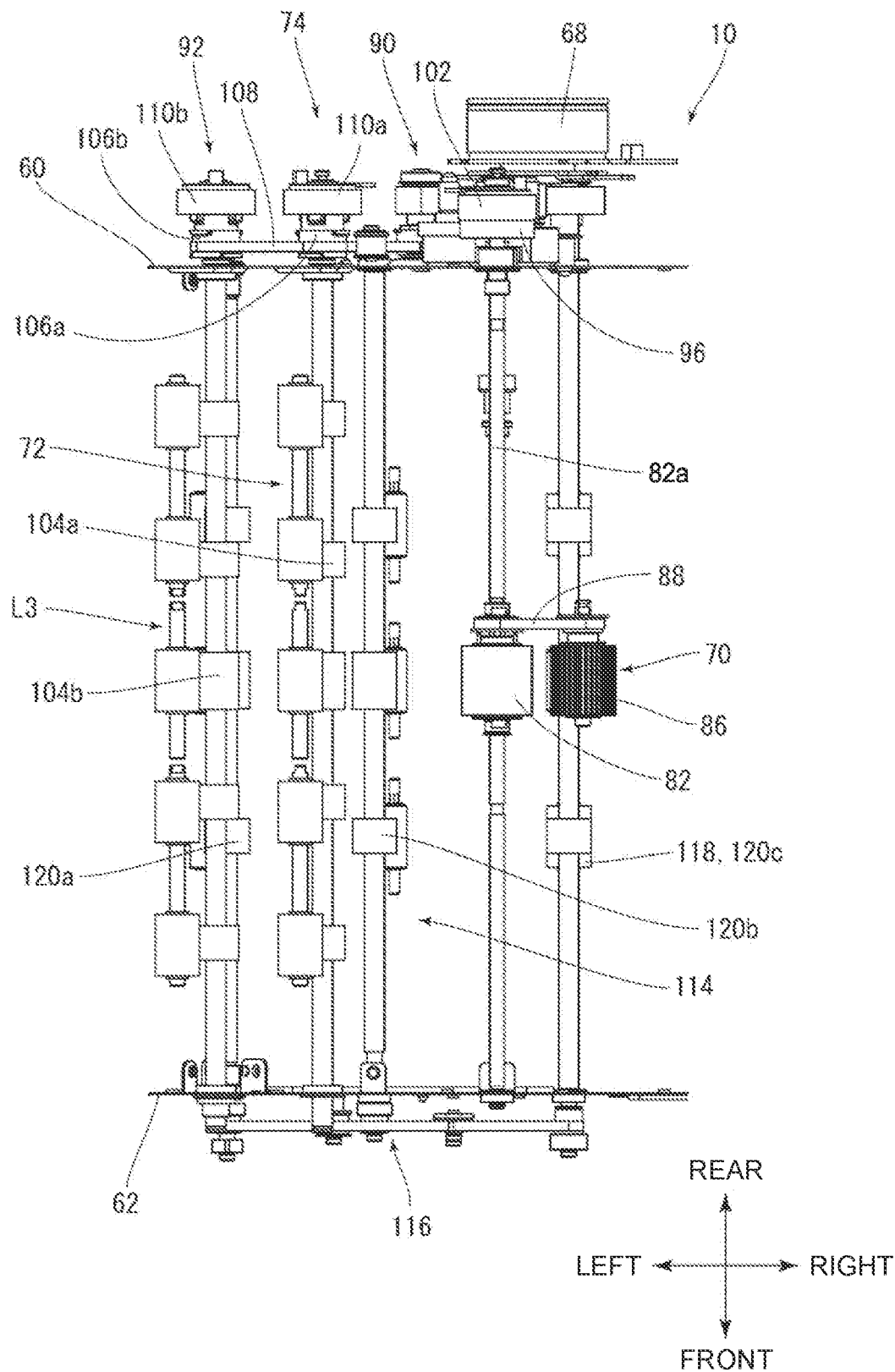
FIG. 6 is a partially enlarged plan view illustrating the configuration of the document feeder.

In an embodiment shown in FIGS. 4 and 6, the first frame 60 and the second frame 62 are made of metal (e.g., sheet metal). The first frame 60 and the second frame 62 are respectively provided in the front and rear directions in parallel with being spaced apart from each other so that a first transport roller 104*a*, 104*b*, a second transport roller 120*a*, 120*b*, 120*c* and the document transport path L3 are located between the first frame 60 and the second frame 62.

The first frame 60 supports one axial end of each of a plurality of rod-like first transport rollers 104*a*, 104*b* and a plurality of rod-like second transport rollers 120*a*, 120*b*, 120*c* as described below. The second frame 62 supports the other axial end of each of a plurality of rod-like first transport rollers 104*a*, 104*b* and a plurality of rod-like second transport rollers 120*a*, 120*b*, 120*c* as described below.

As shown in FIG. 1, similar to the first image reader 50, the second image reader 54 is also provided with a light source 54*a*, a plurality of mirrors 54*b*, an imaging lens 54*c*, a reading sensor 54*d*, etc. These are disposed inside the housing 52 with being unitized. The second image reader 54 can carry out the moving image reading in which an image of a document W being transported along the document transport path L3 is read. Namely, in the case where the user requests a double-sided reading of the document W, as the document W being transported along the document transport path L3 is passing through a second image reading position P2, the second image reader 54 reads the image of the document W's surface on the side of the second image reader 54 (i.e., back side).

As shown in FIG. 1, the document transport path L3 is a passage for a document W, which is configured with a guide member or the like in order to guide the document W to the image reading positions P1 and P2 for reading the image. The document transport path L3 is configured to extend in a U-shape from the paper feeding opening 52*a* to the paper discharging opening 52*b* so as to surround an outer surface of the second image reader 54.

Figure 5:
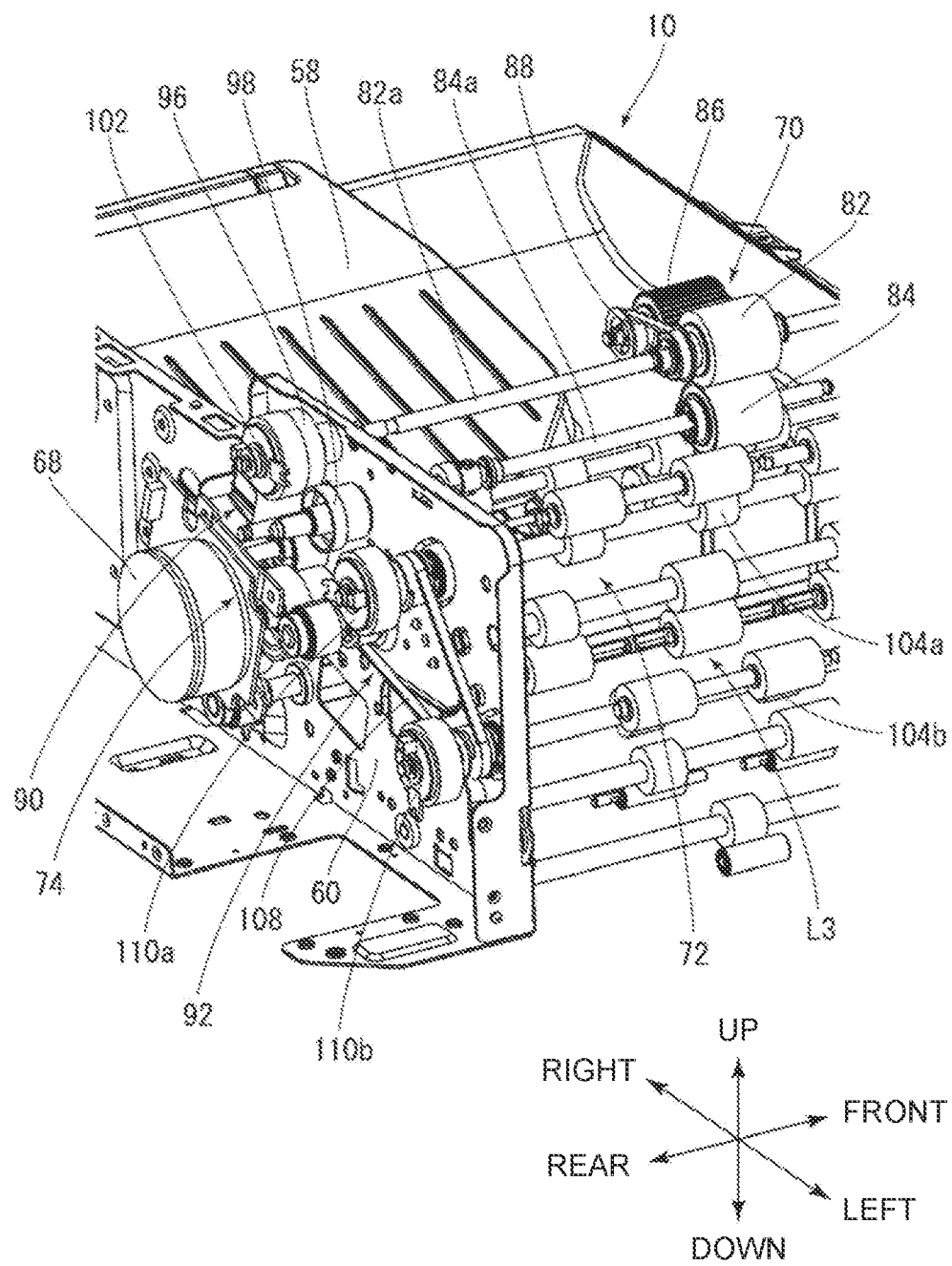
FIG. 5 is a partially enlarged perspective view illustrating the configuration of the document feeder when viewed from obliquely upward rear.

As shown in FIG. 5, the document feeder 10 includes a motor 68 (corresponding to a first driving source), a paper feeder 70 and a first transporter 72 disposed along the document transport path L3, and a first driver 74 which is provided on the first frame 60 and transmits rotational driving force generated by the motor 68 to the paper feeder 70 and the first transporter 72.

Figure 7:
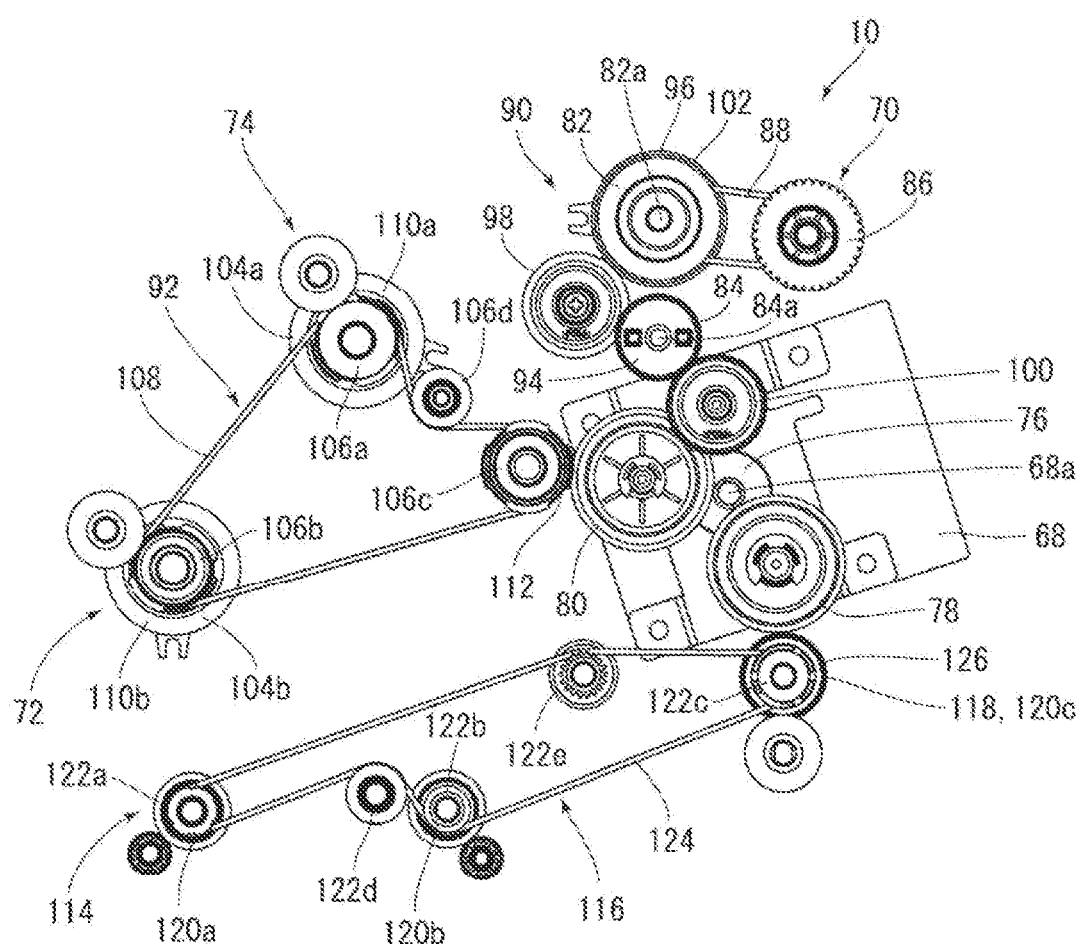
FIG. 7 is a front view illustrating the configuration of a main part of the document feeder.

The motor 68 is a drive source of the whole document feeder 10, which is provided in the vicinity of the hinge device 44 shown in FIG. 3 on the rear side of the first frame 60. As shown in FIG. 7, a driving gear 76 is provided on a rotating shaft 68*a* of the motor 68. A first connection gear 78 and a second connection gear 80 are arranged so as to mechanically sandwich the driving gear 76 on both sides thereof and mesh with the driving gear 76. Namely, the first connection gear 78 and the second connection gear 80 are disposed at positions apart from each other in a circumferential direction of the driving gear 76.

As shown in FIGS. 5 and 7, the paper feeder 70 supplies the document W stacked on the document stacking tray 56 (FIG. 1) to the document transport path L3 one by one, and includes a paper feeding roller 82, a separation roller 84 paired with the paper feeding roller 82, a pickup roller 86, and an annular belt 88 for transmitting rotational force of the paper feeding roller 82 to the pickup roller 86.

The first driver 74 includes a paper feeding driver 90 to transmit the rotational force generated by the motor 68 to the paper feeder 70, and a transporting driver 92 to transmit the rotational force generated by the motor 68 to the first transporter 72. As shown in FIG. 7, the paper feeding driver 90 includes a gear 94 provided on a rotating shaft 84a of the separation roller 84, a gear 96 provided on a rotating shaft 82a of the paper feeding roller 82, an idle gear 98 provided therebetween, and an idle gear 100 provided at the most upstream part of a force transmission path in the paper feeding driver 90 so as to mesh with the gear 94 of the separation roller 84. The idle gear 100 corresponds to "a third gear" of the present invention and meshes with the second connection gear 80.

In addition, as shown in FIG. 7, the paper feeding driver 90 includes a clutch 102 provided on the gear 96 of the paper feeding roller 82. When the clutch 102 is ON, the rotational force of the motor 68 is transmitted to the paper feeding roller 82 and the pickup roller 86, and when the clutch 102 is OFF, the rotational force of the motor 68 is shut out and not transmitted. Therefore, a load of the motor 68 when the clutch 102 is ON is greater than that of the motor 68 when the clutch 102 is OFF. The vibration of the paper feeding driver 90 can be attributed to the load variation of the motor 68.

As shown in FIG. 6, the first transporter 72 has a plurality of rod-like first transport rollers 104a, 104b for transporting a document W, which is supplied to the document transport path L3 by the paper feeder 70, toward the image reading positions P1, P2 (FIG. 1). In the present embodiment, two first transport rollers 104a, 104b are provided in a transport direction of the document W with being spaced apart from each other. The two first transport rollers 104a and 104b are resist rollers which intermittently transport the document W toward the image reading positions P1 and P2 (FIG. 1). one axial end of each of the two first transport rollers 104a, 104b is supported by the first frame 60, and the other axial end thereof is supported by the second frame 62.

As shown in FIG. 7, the transporting driver 92 of the first driver 74 includes a first pulley 106a provided on the first transport roller 104a on the upstream side, a second pulley 106b provided on the first transport roller 104b on the downstream side, a third pulley 106c provided in the vicinity of the motor 68, an idle pulley 106d provided between the first pulley 106a and the third pulley 106c, and an annular belt 108 stretched over the foregoing pulleys 106a to 106d.

In addition, the transporting driver 92 includes a first clutch 110a provided on the first pulley 106a, a second clutch 110b provided on the second pulley 106b, and a gear 112 provided integrally with the third pulley 106c at the most upstream part of the force transmission path in the transporting driver 92. A gear 112 of the third pulley 106c corresponds to "a second gear" of the present invention and meshes with the second connection gear 80. Accordingly, the second connection gear 80 is mechanically sandwiched between the idle gear 100 (third gear) constituting the paper feeding driver 90 and the gear 112 (second gear) of the third pulley 106c constituting the transporting driver 92, In the present embodiment, the gear 112 (second gear) of the third pulley 106c and the idle gear 100 (third gear) are arranged so as to mechanically sandwich the second connection gear 80, that is, be apart from each other in the circumferential direction of the second connection gear 80.

When the first clutch 110a and the second clutch 110b are ON, the rotational force of the motor 68 is transmitted to the first transport rollers 104a, 104b which respectively correspond to the first clutch 110a and the second clutch 110b, and when the first clutch 110a and the second clutch 110b are OFF, the rotational force of the motor 68 is shut out and not transmitted. Therefore, a load of the motor 68 when the first clutch 110a and the second clutch 110b are ON is greater than that of the motor 68 when the first clutch 110a and the second clutch 110b are OFF. The vibration of the transporting driver 92 can be attributed to the load variation of the motor 68.

As shown in FIG. 4, the document feeder 10 further includes a second transporter 114 disposed along the document transport path L3, a second driver 116 which is provided on the second frame 62 and transmits the rotational driving force generated by the motor 68 to the second transporter 114, and a relay transmission member 118 for transmitting the rotational force generated by the motor 68 to the second driver 116.

As shown in FIG. 6, the second transporter 114 has a plurality of rod-like second transport rollers 120a, 120b, 120c for transporting a document W in which the image has been read toward the document discharging tray 58 while supplying the document W being transported through the document transport path L3 by the first transporter 72 toward the image reading positions P1, P2 (FIG. 1). Iii the present embodiment, three second transport rollers 120a, 120b, and 120c are provided in a transport direction of the document W with being spaced apart from each other one axial end of each of the three second transport rollers 120a, 120b, and 120c is supported by the first frame 60, and the other axial end thereof is supported by the second frame 62. In the present embodiment, a paper discharging roller (not shown) for discharging the document W to the document discharging tray 58, whose description is omitted here, is provided on the downstream side of the second transporter 114.

As shown in FIG. 7, the second driver 116 includes a first pulley 122a provided on the second transport roller 120a on the most upstream side, a second pulley 122b provided on the second transport roller 120b on the downstream side of the first pulley 122a, and a third pulley 122c provided on the second transport roller 120c on the downstream side of the second pulley 122b. In addition, the second driver 116 includes an idle pulley 122d provided between the first pulley 122a and the second pulley 122b, an idle pulley 122e provided between the first pulley 122a and the third pulley 122c, and an annular belt 124 stretched over the foregoing pulleys 122a-122e.

As shown in FIG. 6, the relay transmission member 118 is a rod-like member for transmitting the rotational force generated by the motor 68 as "a first driving source" to the second driver 116, and configured by the second transport roller 120c that is one of a plurality of rod-like second transport rollers 120a, 120b, 120c.

As shown in FIG. 7, a gear 126 is provided at one axial end of the relay transmission member 118 (i.e., the second transport roller 120c), that is, at the end on the first frame 60 side of the relay transmission member 118. The gear 126 of the relay transmission member 118 corresponds to "a first gear" of the present invention and meshes with the first connection gear 78. The first connection gear 78 is mechanically sandwiched between the driving gear 76 of the motor 68 and the gear 126 (first gear) of the relay transmission member 118 so that the first connection gear 78 meshes with both the driving gear 76 and the gear 126 Namely, the driving gear 76 and the gear 126 (i.e., a first gear) are disposed at positions apart from each other in a circumferential direction of the first connection gear 78.

The above described configuration according to the first embodiment enables the following effects to be achieved. As shown in FIG. 6, the first frame 60 and the second frame 62 are configured to respectively support both axial ends of the first transport rollers 104a, 104b and the second transport rollers 120a, 120b, 120c, the first driver 74 to transmit the driving force to the paper feeder 70 and the first transporter 72 is provided on the first frame 60, and the second driver 116 to transmit the driving force to the second transporter 114 is provided on the second frame 62. Therefore, even when the first driver 74 vibrates during operation of the paper feeder 70 and the first transporter 72, the vibration is unlikely transmitted from the first frame 60 to the second frame 62, so that the vibration of the second driver 116 provided on the second frame (32 can be suppressed, as well as the vibration of the second transporter 114, which is attributed to the vibration of the second driver 116, can be suppressed. This allows the vibration of the document W supplied to the image reading positions P1 and P2 by the second transport rollers 120a, 120b, 120c to be suppressed, thereby the accuracy of reading the images at the image reading positions P1 and P2 can be improved.

Furthermore, according to the first embodiment, since the rotational force generated by the motor 68 as "a first drive source" is transmitted to the second driver 116 via the relay transmission member 118, it is possible to drive both the first driver 74 and the second driver 116 by a single motor 68, so that the number of parts can be reduced compared to the configuration in which the first driver 74 and the second driver 116 are independently driven by separate motors.

Moreover, as shown in FIG. 6, since the relay transmission member 118 is configured by the second transport roller 120c which is one of the plurality of second transport rollers 120a, 120b, 120c, the number of parts can be reduced compared to the configuration in which the second transport roller 120c and the relay transmission member 118 are separate parts.

As shown in FIG. 7, since the first connection gear 78 is mechanically sandwiched between the driving gear 76 and the gear 126 (first gear) of the relay transmission member 118, the vibration of the driving gear 76 disappears as it propagates through the first connection gear 78, the gear 126 (first gear), and the relay transmission member 118. As a result, it is possible to suppress the vibration of the driving gear 76 from being transmitted to the second driver 116, and thus it is possible to suppress the vibration of the document W which is transported by the second transport rollers 120a, 120b, 120c.

As shown in FIG. 7, since the first connection gear 78 for transmitting the driving force to the second driver 116 and the second connection gear 80 for transmitting the driving force to the transporting driver 92 of the first driver 74 are disposed at each position where they mechanically sandwiches the driving gear 76, that is, at each position where they are spaced apart from each other in the circumferential direction of the driving gear 76, it is possible to effectively suppress the vibration generated at the transporting driver 92 from being transmitted to the second driver 116.

As shown in FIG. 7, in the first driver 74, since the second connection gear 80 is mechanically sandwiched between the idle gear 100 (third gear) which configures the paper feeding driver 90 and the gear 112 (second gear) of the third pulley 106c which configures the transporting driver 92, it is possible to suppress the vibration generated at the paper feeding driver 90 from being transmitted to the transporting driver 92, and thus it is possible to suppress the vibration of the document W which is transported by the first transporter 72. Furthermore, since the gear 112 (second gear) and the idle gear 100 (third gear) are disposed at each position where they mechanically sandwich the second connection gear 80, that is, at each position where they are spaced apart from each other in the circumferential direction of the second connection gear 80, it is possible to effectively suppress the vibration generated at the paper feeding driver 90 from being transmitted to the transporting driver 92.

The specific configurations described above are merely examples and can be appropriately changed according to the actual product specifications. For example, although the relay transmission member 118 shown in FIG. 6 is configured by the second transport roller 120c which is one of the plurality of second transport rollers 120a, 120b, 120c, the second transport rollers 120a, 120b, 120c and the relay transmission member 118 may be separately configured as independent parts (not shown). Furthermore, in place of the rod-like relay transmission member 118, some relay transmission member including a pulley and a belt (not shown) may be employed.

Furthermore, in the first driver 74 and the second driver 116 shown in FIG. 7, although a belt transmission type using belts 108, 124 is employed as a driving force transmitting method, a gear transmission type using gears may be employed instead thereof.

Although the document feeder 10 shown in FIG. 1 is incorporated into the image forming apparatus 12 as a part of the image reading device 14, the document feeder 10 may be used as a separated product (i.e., an independent product). Furthermore, the document feeder 10 need not necessarily include the second image reader 54 (FIG. 1).

Although the image forming apparatus 12 shown in FIG. 1 is configured as a color machine, the image forming apparatus 12 may be configured as a monochrome machine which forms monochrome images on a paper. In addition, as an image forming method, an inkjet type or the like may be employed instead of a laser type.

Second Embodiment

Next, a document feeder 130 according to a second embodiment of the present invention is described below. The document feeder 130 according to the second embodiment shown in FIG. 8 is different from the document feeder 10 according to the first embodiment in that the former has a motor 132 (corresponding to a second driving source) to provide the rotational driving force to the second driver 116, while the latter has the first connection gear 78 and the relay transmission member 118 (FIG. 6) to provide the rotational driving force to the second driver 116, As other configurations of the document feeder 130 according to the second embodiment are the same as those of the document feeder 10 according to the first embodiment including variations, the description of the other configurations is omitted or simplified.

Figure 8:
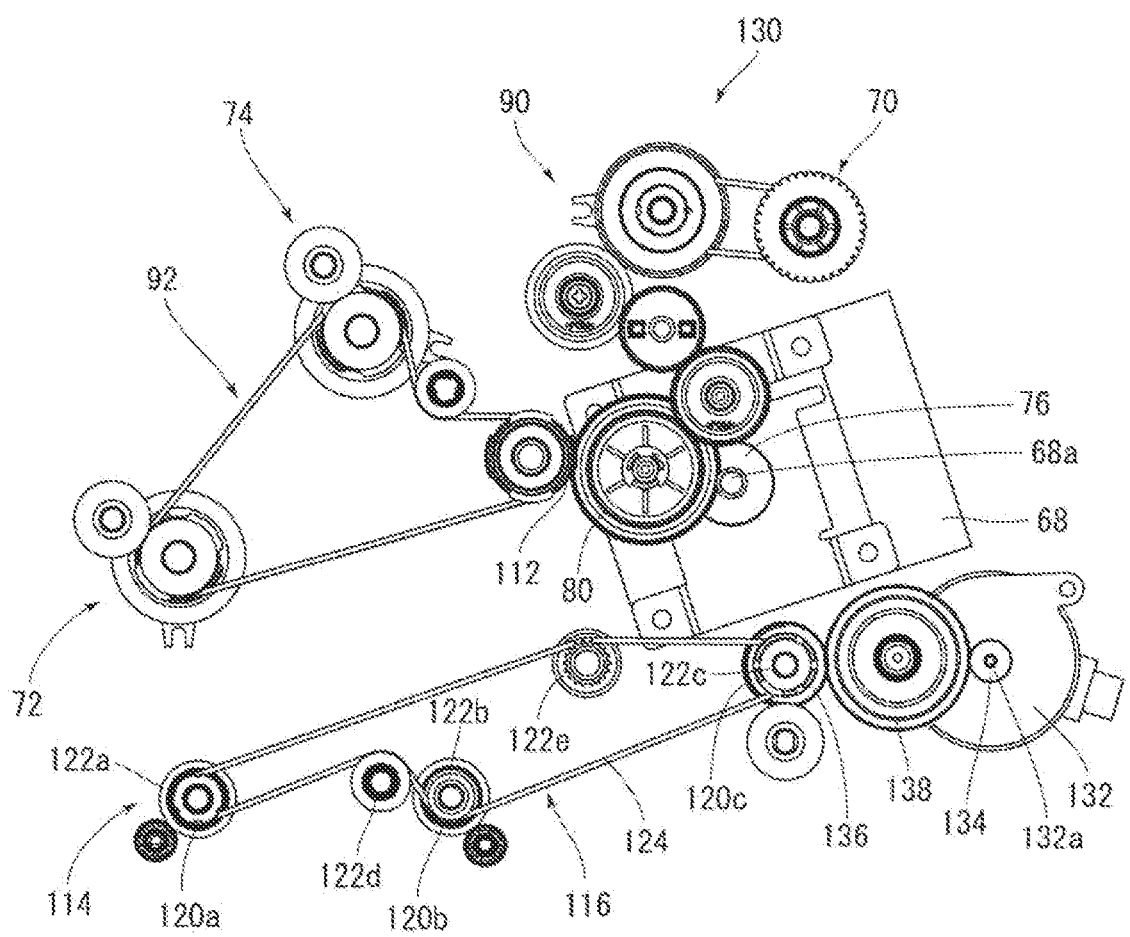
FIG. 8 is a front view illustrating the configuration of the main part of the document feeder according to a second embodiment of the present invention.

As shown in FIG. 8, the document feeder 130 according to the second embodiment includes a motor 132 as "a second driving source" provided on the second frame 62, a driving gear 134 provided on a rotating shaft 132a of the motor 132 (i.e., a second driving source), a gear 136 provided on the other axial end of the second transport roller 120c, which faces against an end portion of the second transport roller 120c on the first frame 60 side (FIG. 4), and a connection gear 138 mechanically sandwiched between the driving gear 134 and the gear 136 of the second transport roller 120c, Accordingly, the rotational force of the motor 132 (second drive source) is transmitted to the second driver 116 via the driving gear 134, the connection gear 138, and the gear 136 of the second transport roller 120c.

According to the document feeder 130 of the second embodiment, since the first driver 74 and the motor 68 (first drive source) are provided on the first frame 60 (FIG. 5), as well as the second driver 116 and the motor 132 (second drive source) are provided on the second frame 62 (FIG. 4), the relay transmission member 118 (FIG. 6) for transmitting the rotational force generated by the motor 68 (first drive source) to the second driver 116 becomes unnecessary, thereby a transmission path, through which the vibration is transmitted from the motor 68 (first drive source) to the second driver 116, can be reduced in length. This allows the vibration of the second driver 116 to be suppressed, so that it is possible to further improve the reading accuracy of the images at the image reading positions P1 and P2 (FIG. 1).

What is claimed is:

1. A document feeder comprising:
    a document transport path to direct a document toward an image reading position where an image reader to read an image is located;
    a document stacking tray to stack the document to be supplied to the document transport path;
    a document discharging tray to dispose the document discharged from the document transport path;
    a paper feeder to supply the document stacked on the document stacking tray to the document transport path one paper at a time;
    a first transporter having a plurality of first transport rollers to transport the document supplied to the document transport path toward the image reading position, the plurality of first transport rollers being located at a downstream position in a transport direction of the document in the first transporter;
    a second transporter having a plurality of second transport rollers to transport the document in which the image has been read toward the document discharging tray while supplying the document transported by the first transporter to the image reading position, the plurality of second transport rollers having shafts that are respectively different from shafts of the plurality of first transport rollers, and being provided on a further downstream position compared with the plurality of first transport rollers;
    a first frame to support one axial end of each of the plurality of first transport rollers and each of the plurality of second transport rollers;
    a second frame to support the other axial end of each of the plurality of first transport rollers and each of the plurality of second transport rollers;
    a first driving source provided on the first frame;
    a first driver provided on the first frame and to transmit a rotational force generated by the first driving source to the paper feeder and the first transporter as a driving force using a first belt or a first gear;
    a second driver provided on the second frame and to transmit the rotational force generated by the first driving source to the second transporter as a driving force using a second belt or a second gear; and
    a relay transmission rod provided across the first frame and the second frame to transmit the rotational force generated by the first driving source to a side of the second frame.

2. The document feeder according to claim 1, wherein the relay transmission rod comprises one of the plurality of second transport rollers.

3. The document feeder according to claim 1, wherein
    a driving gear is provided on a rotating shaft of the first driving source,
    a third gear is provided on the relay transmission rod, and
    a first connection gear is provided between the driving gear and the third gear so as to mesh therewith.

4. The document feeder according to claim 3, wherein the first driver comprises:
    a paper feeding driver to transmit the rotational force generated by the first driving source to the paper feeder as the driving force; and
    a transporting driver to transmit the rotational force generated by the first driving source to the first transporter as the driving force,
    a fourth gear is provided at a most upstream part of a force transmission path in the transporting driver,
    a second connection gear is provided between the driving gear and the fourth gear so as to mesh therewith, and
    the first connection gear and the second connection gear are arranged at each position to sandwich the driving gear.

5. The document feeder according to claim 4, wherein
    a fifth gear is provided at a most upstream part of a force transmission path in the paper feeding driver, and
    the fifth gear meshes with the second connection gear.

6. The document feeder according to claim 5, wherein the fourth gear and the fifth gear are arranged at each position to sandwich the second connection gear.

7. An image forming apparatus comprising the document feeder according to claim 1.

8. A document feeder comprising:
    a document transport path to direct a document toward an image reading position where an image reader to read an image is located;
    a document stacking tray to stack the document to be supplied to the document transport path;
    a document discharging tray to dispose the document discharged from the document transport path;
    a paper feeder to supply the document stacked on the document stacking tray to the document transport path one paper at a time;
    a first transporter having a plurality of first transport rollers to transport the document supplied to the document transport path toward the image reading position;
    a second transporter having a plurality of second transport rollers to transport the document in which the image has been read toward the document discharging tray while supplying the document transported by the first transporter to the image reading position;
    a first frame to support one axial end of each of the plurality of first transport rollers and the plurality of second transport rollers;
    a second frame to support the other axial end of each of the plurality of first transport rollers and the plurality of second transport rollers;
    a first driving source provided on the first frame;
    a second driving source provided on the second frame;
    a first driver provided on the first frame and to transmit a rotational force generated by the first driving source to the paper feeder and the first transporter as a driving force using a first belt or a first gear; and
    a second driver provided on the second frame and to transmit a rotational force generated by the second driving source to the second transporter as a driving force using a second belt or a second gear.

* * * * *